May 29, 1956  R. A. BENNETT  2,747,709
REVERSE ROTATION CHECK MEANS
Filed Dec. 10, 1952  2 Sheets-Sheet 2
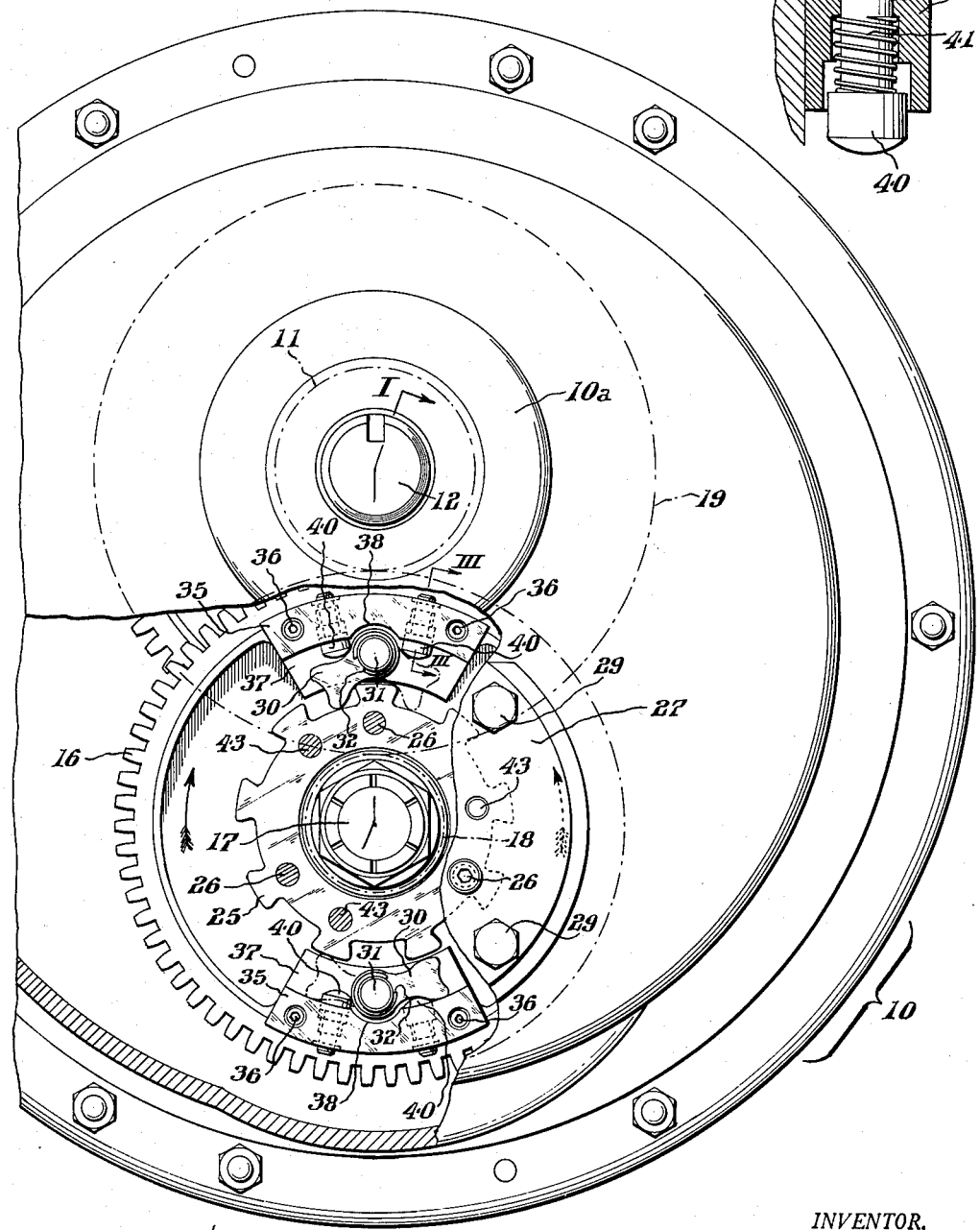

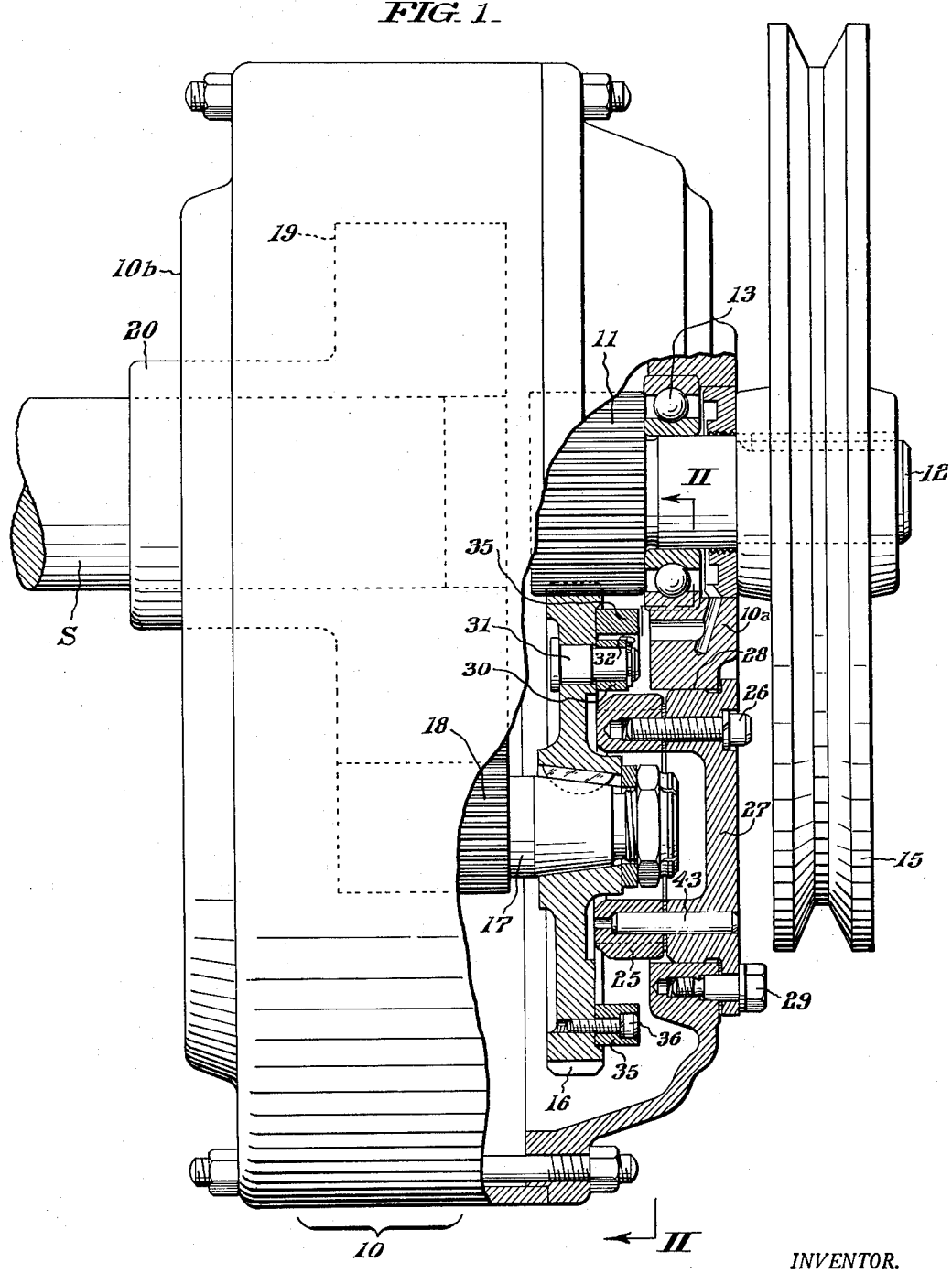

United States Patent Office 2,747,709
Patented May 29, 1956

2,747,709

REVERSE ROTATION CHECK MEANS

Richard A. Bennett, Elkins Park, Pa., assignor to The American Pulley Company, Philadelphia, Pa., a corporation of Pennsylvania Application December 10, 1952, Serial No. 325,189

4 Claims. (Cl. 192—7)

This invention relates to reverse rotation check means useful more particularly in connection with powered speed reducing drive devices of the type disclosed in U. S. Patent No. 2,504,066 granted to J. B. Christian on April 11, 1950, adapted to be applied to one end of the shaft of a machine or apparatus to be driven. The present invention may be regarded as an improvement upon the reverse rotation check means disclosed in U. S. Patent No. 2,543,482 granted to William A. Williams on February 27, 1951. In the latter reference, the check means is located exteriorly of the casing of the speed reducer, and the checking is accomplished by cooperation between pawls carried by a member affixed to the power or input high-speed shaft of the reducer and a peripherally notched ratchet-like ring affixed to the casing of the reducer in concentric relation to said shaft. Due to being exteriorly located, the parts of the check means of Williams are exposed to the deteriorating and clogging action of dust and dirt, and require lubrication independently of the moving parts within the casing of the device. Moreover, due to the high-speed of the pawl carrier, the device, as a whole, is subjected to severe shocks as the pawls lock into the stationary ratchet ring when power is reversely applied accidentally.

The chief aim of my invention is to provide a reverse rotation check means capable of incorporation interiorly of the casing of the speed reducing device so as to be constantly lubricated with the other enclosed parts, and in which the pawls are carried by a member mounted on one of the slower rotating shafts of the unit so that reverse checking is achieved with less shock and strain than in the Williams' structure.

Other objects and attendant advantages will appear from the following detailed description of the attached drawings, wherein:

Fig. 1 is a fragmentary view partly in side elevation and partly in section of a speed reduction device embodying my invention, the section being taken as indicated by the angled arrows I—I in Fig. 2.

Fig. 2 is a fragmentary view showing, in part, the front elevation of the organization and, in part, a cross section taken as indicated by the angled arrows II—II in Fig. 1; and Fig. 3 is a fragmentary detail section taken as indicated by the angled arrows III—III in Fig. 2.

The speed reducing unit herein illustrated for convenience of exemplifying my invention is, generally speaking, of well-known construction in that it has an oil-tight casing 10 in which the speed reducing gearing is enclosed. This gearing includes a high-speed pinion 11 in the input shaft 12 of the speed reducer, which shaft extends through one side of wall 10a of the casing and is journalled in ball bearings one of which is indicated at 13 in Fig. 1. Keyed or otherwise affixed to the protruding end of input shaft 12 is a sheave 15 for power application to the reducer by a V belt (not shown). Pinion 11 meshes with an intermediate speed gear 16 on a counter shaft 17 whereon is also mounted or integrally formed a pinion 18 which meshes with a bull gear 19 whereof the hub 20 constitutes the output shaft 20 of the reducer. Output shaft 20 extends through the opposite side wall 10b of casing 10 for connection to the shaft S of the machine or apparatus to be driven and is rotatively supported in suitable outer friction bearings (not shown) set into said wall.

The reverse rotation check means with which the present invention is more especially concerned, includes a square toothed stop ring 25 which surrounds the hub of gear 16 within casing with provision of an annular clearance between it and its hub. Stop ring 25 is secured by means of cap screws 26 to the inner side of a cover plate 27 which closes a co-axial access opening 28 in the side wall 10a of casing 10 and which is secured, in turn, by cap screws 29 to said casing wall. Arranged to cooperate with the stop ring 25 are two pawls 30 which are pivoted respectively on headed studs 31 at diametrically opposite points on intermediate speed gear wheel 16. As shown, the heads of the studs 31 abut the spoke web of the gear wheel 18 at one side, and their shanks extend through said web and protrude beyond the back of said wheel. The pawls 30 are double ended and are held in place in the assemblage by split ring 32 engaged in peripheral grooves in the protruding ends of the studs 31. Disposed in radial alignment with pivot studs 31 are arcuate guard blocks 35 which are secured by means of screws 36 to machined pads 37 on gear wheel 16 adjacent the rim of the latter. The guard blocks 35 are cut away at the center as at 38 in Fig. 2 to clear the hub portions of the pawls 30. Axially slidable in apertures radial to the axis of shaft 17 and respectively equidistant from the pivot stud 31 in each guard block 35 are stop pins 40 each of which is yieldingly urged toward said shaft by a light spring 41 as instanced in Fig. 3, inward movement of the pin being limited by engagement of a split collar 42 at its outer end with the outer arcuate edge of the corresponding block.

With the pawls 30 positioned as in Fig. 2, gear wheel 16 is free to rotate in the direction of the full line arrow thereon. When wheel 16 reaches a certain speed in its rotation, the pawl 30 will be displaced outwardly by centrifugal action clear of the stationarily held stop ring 25 and be thereby maintained retracted in contact with the inner curved edges of the guard blocks 35 as will be readily understood, incident to which the pins 40 will be depressed against the pressure of the light springs 41. On the other hand, when wheel 16 is at rest, the pins 40, under the influence of their springs 42, will force the pawls 30 inward into engagement with toothed stop ring 25 as shown in Fig. 2. Thus, if gear 16 should be reversely started, i. e., in the direction indicated by the dotted line arrow in Fig. 2, it will be arrested by engagement of one or the other of pawls 30 with the tooth of stop ring 25 immediately ahead of it in the direction of reverse rotation.

By removing cover plate, together with stop ring 25, and positioning the pawls 30 as shown in dot and dash lines in Fig. 2, it will be seen that upon replacement of said plate reverse rotation of gear wheel 16 will be prevented if its normal direction of rotation is as indicated by the dotted line arrow. In the latter instance, the springs 41 will react upon the pawls 30 as before to force them into cooperative relation with the stop ring 25. In order to insure proper replacement of the ring 25 relative to the cover plate 27, I have provided the dowel pins shown at 43. In practice, casing 10 is kept partly filled with oil so that the parts of the check means as well as the enclosed gearing are constantly lubricated against rapid wear.

Having thus described my invention, I claim:

1. Reverse rotation check means for a speed change drive device having an oil tight casing with an input shaft extending through one of the side walls of the casing for power application, an output shaft extending through the opposite side wall for connection to a shaft of a machine or apparatus to be driven, and a train of speed change gear wheels within the casing for transmitting power from the input to output shaft: said rotation check means including a circular stop element with a notched periphery affixed to a closure plate removably secured over an access opening in one of the side walls of the casing in coaxial relationship with one of the enclosed gear wheels of the train; at least one detent pivotally connected to confronting face of said one gear wheel to cooperate with the notched stop element; and means on said one gear wheel for limiting outward swing of said detent under influence of said centrifugal force during normal operation of the device in driving the shaft of the machine or apparatus in the desired direction.

2. Reverse rotation check means for speed change drive device having an oil tight casing with an input shaft extending through one of the side walls of the casing for power application, an output shaft extending through the opposite wall for connection to the shaft of a machine or apparatus to be driven, and a train of speed change gear wheels within the casing for transmitting power from the input shaft to the output shaft; said rotation check means including a circular stop element with a notched periphery affixed to a closure plate removably secured over an access opening in one of the walls of the casing in coaxial relationship with one of the enclosed gear wheels of the train; at least one double-ended detent which can be changeably positioned about a pivot on said gear wheel to cooperate with the notched stop element in accordance with the direction in which reverse rotation of the shaft of the machine or apparatus is to be prevented; and means on said one gear wheel for limiting the outward swing of said detent under the influence of centrifugal force during normal operation of the device in driving the shaft of the machine or apparatus in the desired direction.

3. Reverse rotation check means for speed change drive device and an oil tight casing with an input shaft extending through one of the side walls of the casing for power application, and an output shaft extending through the opposite side wall for connection to the shaft of the machine or apparatus to be driven, and a train of speed change gear wheels within the casing for transmitting power from the input shaft to the output shaft; said rotation check means including a circular stop element with a notched periphery affixed to the inner side of one of the casing walls in concentric relationship to one of the gear wheels of the train, said one gear wheel having a lateral projection adjacent its periphery; at least one detent pivotally connected to said projection to cooperate with the notched stop element; means on said projection for limiting the outward swing of said detent under the influence of centrifugal force during normal operation of the device in driving the shaft of the machine or apparatus in the desired direction; and a spring pressed plunger constrained to axial movement in the projection of said one gear wheel and tending to urge the detent in to engagement with the notched stop element.

4. Reverse rotation check means for speed change drive device having an oil tight casing with an input shaft and an output shaft extending through the opposite wall for connection to the shaft of the machine or apparatus to be driven, and a train of speed change gear wheels within the casing for transmitting power from the input shaft to the output shaft; said rotation check means including an annular stop element with a tooth periphery affixed to the inner side of one of the casing walls in concentric relationship to one of the enclosed gear wheels of the train, said one gear wheel having a lateral projection adjacent the periphery, at least one double-ended detent pivoted on the lateral projection of said gear wheel for capacity to be changed in position to cooperate with the notched stop element in accordance with which direction reverse rotation of the shaft of the machine or apparatus is to be prevented; and spring pressed plungers constrained to axial movement in the projection at opposite sides of the pivot of the detent, one of said plungers tending to urge the detent into engagement with the stop element when in one position of operation, and the other projection tending to urge the detent into engagement with the stop element when the detent is placed in its other position.

References Cited in the file of this patent

UNITED STATES PATENTS

| | | |
|---|---|---|
| 2,070,698 | Tinghir | Feb. 16, 1937 |
| 2,543,482 | Williams | Feb. 27, 1951 |